AUTOMOTIVE VEHICLE WASH SYSTEMS

Original Filed May 27, 1966 2 Sheets-Sheet 1

Fig. 1-A

INVENTOR
H. L. Null
BY
Wofford & Fleeman
ATTORNEYS

AUTOMOTIVE VEHICLE WASH SYSTEMS

Original Filed May 27, 1966 2 Sheets-Sheet 2

INVENTOR
H. L. Null
BY
Wofford & Felsman
ATTORNEYS

United States Patent Office

Re. 27,049
Reissued Feb. 9, 1971

27,049

AUTOMOTIVE VEHICLE WASH SYSTEMS

H. L. Null, 4004 Golden Oaks Drive,
Fort Worth, Tex. 76117

Original No. 3,389,860, dated June 25, 1968, Ser. No. 553,392, May 27, 1966. Application for reissue Dec. 24, 1968, Ser. No. 799,135
Int. Cl. B05b *9/00*
U.S. Cl. 239—124 4 Claims

Matter enclosed in heavy brackets [ ] appears in the original patent but forms no part of this reissue specification; matter printed in italics indicates the additions made by reissue.

ABSTRACT OF THE DISCLOSURE

Following is disclosed an automotive vehicle wash system having separate rinse and wash water circulation loops. Control valves disposed in lines connected with the rinse and wash water circulation loops provide essential instantaneous change from rinse to wash water at each car wash location. Parallel electrical controls enable each car wash stall or location to energize common wash or rinse water primary motors, while preventing interference between the wash and rinse water solenoid control valves used at each location. A conductivity sensing element in a wash water storage tank controls a solenoid valve to intermittently add water to control cleaning compound concentration.

Figure 1:
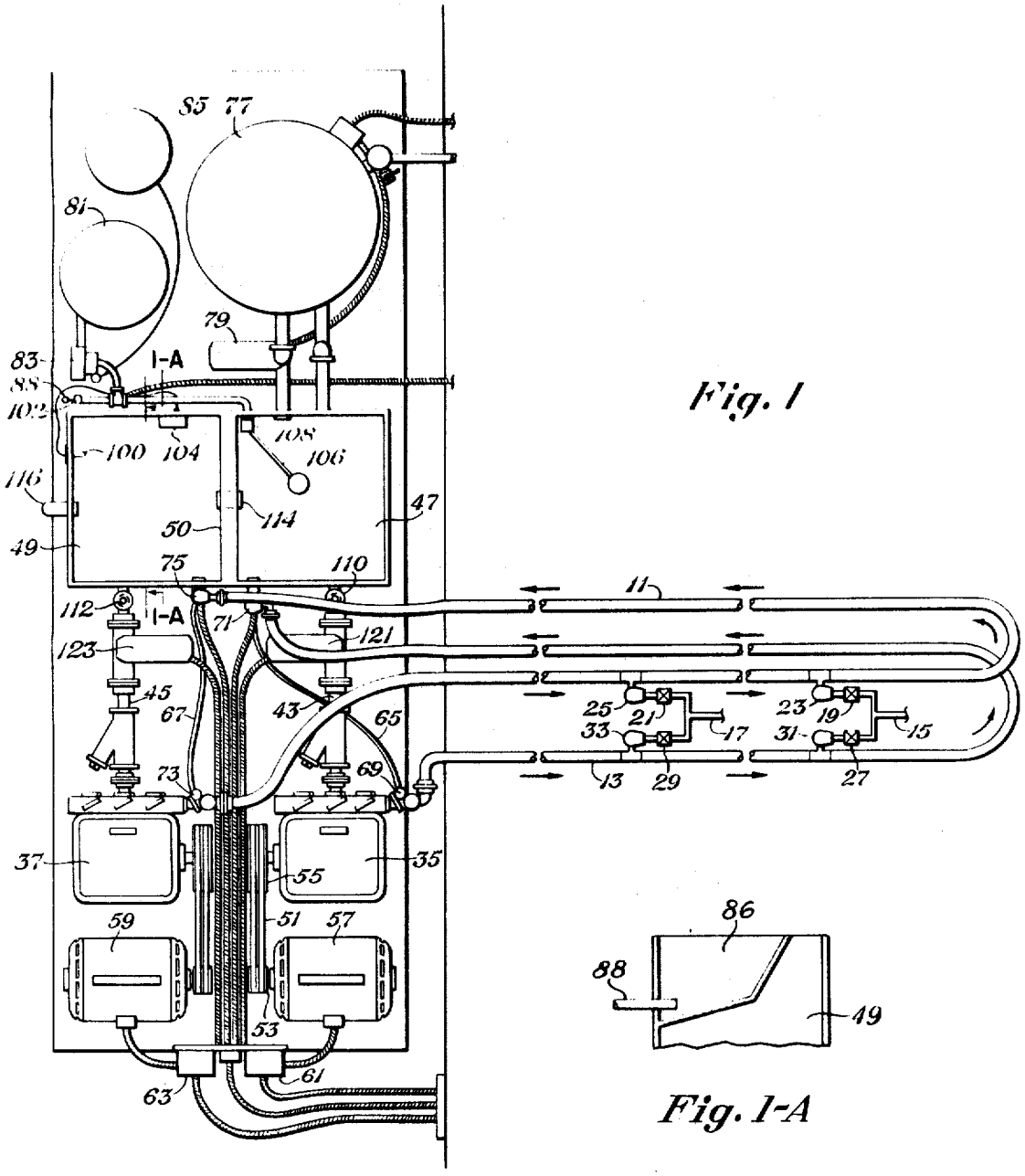

My invention relates in general to systems utilized in washing automotive vehicles, especially automobiles, and in particular to improved systems which provide wash water and rinse water at selected wash locations or stalls in an improved manner.

Previously, car wash systems have been developed in which a wash water containing a soap or detergent and rinse water are pumped through conduits to movable spray nozzles located in a number of usually parallel car wash stalls. Preferably a coin-operated meter is used at each car wash location, and control means provided so that wash water and rinse water may be supplied to each spray nozzle in quantities controlled by the person washing his car.

The most common prior car wash system had a pump for each car wash stall, and wash and rinse water was pumped through relatively long conduits to each stall. In instances where each car wash stall had a single conduit that transmitted both wash and rinse water from the equipment room, there was a significantly long delay between the instant the control switch was moved between the "rinse water" and the "wash water" positions and the instant in which the rinse and wash water reached the spray nozzle. This time delay resulted from the necessity for flushing the previously used fluid from the long conduit before the newly selected fluid reached the spray nozzle.

Also, prior art system had the disadvantage that the water, after warmed in the equipment room, cooled during periods of nonuse and sometimes froze during cold weather. The resulting pressure increase in the system, if instances where each car wash stall had a single conduit frozen, frequently damaged the system components, especially the pumps.

It is accordingly, the general object of my invention to provide improved automotive vehicle wash systems.

Another object of my invention is to provide improved automotive vehicle wash systems in which warm wash and rinse water is essentially instantaneously available at each wash location or stall.

Another object of my invention is to provide means in automobile vehicle wash system to prevent damage to the components of the system, especially the pumps, due to excessive fluid pressurization.

Another object of my invention is to provide an automotive vehicle wash system which requires fewer pumps in the larger, multi-stall installations, enabling the provision of higher quality pumps and related components at a lower cost.

Another object of my invention is to provide in an automotive vehicle wash system improved and advantageous control apparatus.

Another object of my invention is to provide improved electric control arrangements for coin-operated automotive vehicle wash systems.

Another object of my invention is to provide an automotive vehicle wash system which prevents the washing compound from settling from solution even while no vehicles are being washed.

*Another object is to provide in an automotive vehicle car wash system of the type having rinse and wash water circulation loops at each car wash location or stall, an electrical meter control system which utilizes mechanically actuated electrical contacts that are controlled by a timer to establish control over each car wash stall, while preventing electrical interference between the meters in the various stalls.*

These and other objects are effected by my invention as will be apparent from the following description taken in accordance with the accompanying drawing, forming a part of this application, in which:

FIG. 1 is schematic plan view of an automatic vehicle car wash system embodying principles of my invention;

FIG. 1–A is a fragmentary, sectional view as seen looking along the lines I–A of FIG. 1.

Figure 2:
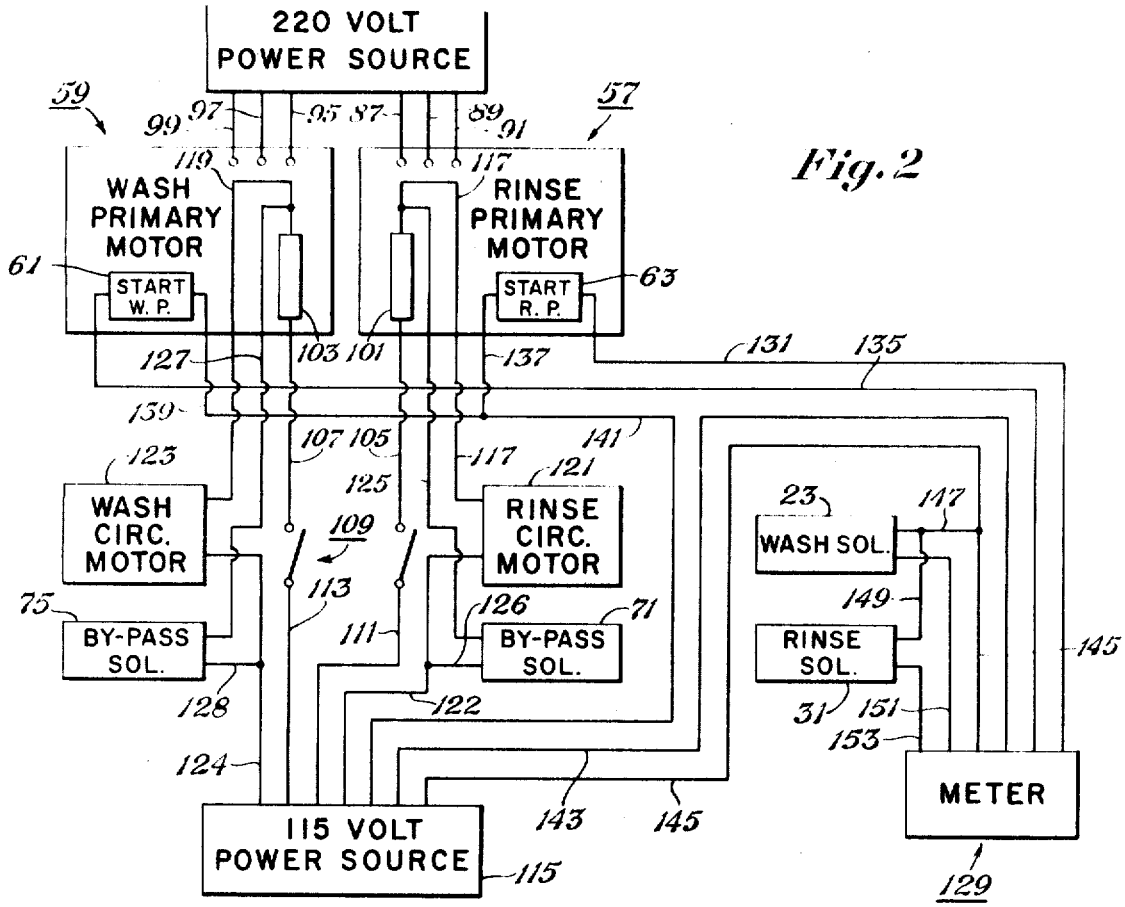
Figure 3:
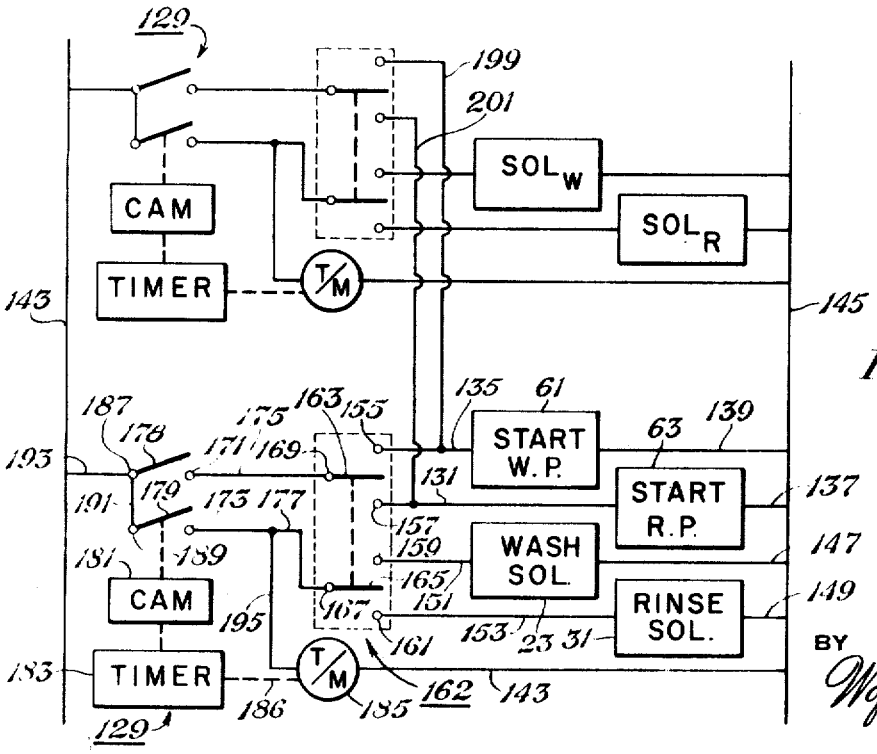

FIG. 2 is a schematic diagram of an electrical control circuit used in the automotive vehicle wash system of FIG. 1; and FIG. 3 is a schematic diagram of an electrical circuit used in the coin-operated meters used in conjunction with the control circuit of FIG. 2.

Referring now to FIG. 1, the numberal 11 designates a wash water circulation loop and the numeral 13 a rinse water circulation loop. Flexible conduits 15, 17 are positioned along the length of the circulation loops at selected car wash locations, commonly called stalls, and communicate with the wash water circulation loop 11 through wash water check valves 19, 21 and wash water control solenoid valves 23, 25. Also, each flexible conduit and spray nozzle 15, 17 communicates with the rinse water circulation loop 13 through check valves 27, 29 and rinse water control solenoid valves 31, 33. The above check valves prevent interchange of wash water and rinse water between their respective loops 11, 13 since there is usually a pressure differential between these loops and only one-way control solenoid valves are now commercially available.

The system is arranged so that warm water continually circulates through loops 11 and 13. For this reason two sets of pumps are used: rinse water and wash water primary pumps 35, 37 and rinse water and wash water circulation motor-pumps 121, 123. The primary pumps communicate respectively via inlet conduits 43, 45 with a rinse water storage tank 47 and a wash water storage tank 49. The control system to be subsequently described causes either the primary pump or the circulating pump of the rinse and wash water circulation loops to be energized so that fluid constantly circulates in both these loops. Notice that the circulating motor-pumps 121, 123 also communicate with the inlet conduits 43, 45 that extend to the storage tanks 47, 49. The primary pumps are driven in this instance by V-belts 51 and suitable pulleys 53, 55 which are rotated preferably by 220 volt electric motors 57, 59. Each of the motors has a magnetic starter 61, 63 which is energized by the subsequently described control circuit means.

From the above it will be seen that the fluid in the rinse water circulation loop 13 may be activated by either the rinse water primary pump 35 or the rinse water circulating pump 121. Similarly, the water in the wash water circulation loop 11 may be activated by either the wash water primary pump 37 or the wash water circulating motor-pump 12. Only one pump in each respective wash water or rinse water circulation loop is energized at any one time, as will be explained in the operational description.

The high capacity and high pressures of the primary pumps of the respective circulation loops are required only when water is to be forced through one or more of the spray nozzles 15, 17 or, in other words, when an automotive vehicle is being washed or rinsed. If no spray nozzle is being used, however, then only the circulating motor-pumps 121, 123 are used since they require less energy and circulate the fluid at a lower pressure.

If wash water flows through one or more of the wash water control solenoid valves 23, 25, wash water primary pump 37 will be automatically energized and wash water circulation motor-pump 123 de-energized. Also, if rinse water flows through one or more of the rinse water control solenoid valves 31, 33, the rinse water primary pump 35 will be automatically energized and the rinse water circulation pump 121 de-energized.

The pressure rating of the primary pumps 35, 37 is commonly 600 p.s.i. When primary pump 35 or 37 is energized, a by-pass solenoid valve 71 or 75 is closed to build up the desired pressure in the circulating loop. These solenoid valves are located preferably in the respective circulation loops adjacent the inlets of the storage tanks, as shown in FIG. 1. The pressures in the circulating loops may exceed 600 p.s.i. and for this reason pressure relief conduits 65, 67 extend respectively between a pressure relief valve 69 and the rinse water storage tank and between the pressure relief valve 73 and the wash water storage tank. If the pressure in the rinse water circulation loop 13, for example, exceeds 600 p.s.i., water will flow through pressure relief conduit 65 into the rinse water storage tank 47. Similarly, if the pressure in the wash water circulation loop 11 exceeds 600 p.s.i., fluid will flow through pressure relief conduit 67 into the wash water storage tank 49.

The above described pressure relief system is especially advantageous since the pressure in the circulating loops might otherwise tend to vary due to the random movement of the water control solenoid valves 23, 25, 31 and 33 between opened and closed positions.

A suitable waterheater 77 having a circulation pump 79 is provided to warm the water in the rinse water storage tank 47, and water softener, normally stored in a softener tank 81, is supplied through a water softener timer and metering device 83 into the rinse water storage tank 47. A brine tank 85 is provided to mix with and regenerate the softener.

A cleaning compound dispenser 86 is shown in FIG. 1–A connected to an upper portion of the wash water storage tank 49, and a water supply line 88 introduces water to the cleaning compound. The resulting mixture of wash water is fed into wash water storage tank 49 through suitable ports (not shown).

The water supply to the cleaning compound dispenser is controlled by an electrical sensing element 100, a solenoid valve 102 and a control unit 104. The sensing element 100 senses changes in the conductivity of the wash water, which varies according to the concentration of cleaning compound. Control unit 104 translates the sensed changes in conductivity via an electrical impulse to the solenoid valve 102, which regulates the flow of water into the cleaning compound dispenser 86. This arrangement provides accurate control over the amount of cleaning compound in the wash water and leads to uniform concentration of the cleaning compound therein.

Preferably a float arm 106 and float valve 108 maintaining a selected water level in rinse water storage tank 47. Manual control valves 110, 112 may be provided in inlet conduits 43, 45 of the primary pumps for maintenance purposes. A check valve 114 located in an upper region of a partition 50 separating the wash and rinse water storage tanks 47, 49 permits flow of rinse water into the wash water storage tank, and an overflow 116 is provided in an upper region of the wash water storage tank.

Referring now to FIG. 2, rinse water primary motor 57 is connected via leads 87, 89 and 91 to preferably a 220 volt power supply. Each of the primary motors has respective magnetic starters 61, 63. Also, auxiliary starting relays 101, 103 are preferably utilized with each motor and communicate via leads 105, 107 with a double pole, single throw control switch 109 and via leads 111, 113 with a source of 115 volt power supply 115 when the switch 109 is closed.

Another pair of leads 117, 119 communicate between auxiliary starting relays 101, 103 and the circulation electric motor-pumps 121, 123.

Leads 125, 127 communicate between the auxiliary starting relays 101, 103 and by-pass solenoid valves 71, 75.

Extending from magnetic starters 61, 63 are leads 131, 135 which communicate with the coin operated timing meter 129. Also extending from the magnetic starters are leads 137, 139 which communicate via conductor 141 with the 115 volt power source.

Extending between power source 115 and meter 129 are a pair of power source electrical conductors or leads 143, 145. Wash water control solenoid valve 23, for example, communicates with lead 145 via a conductor 147, and also, rinse water control solenoid valve 31 communicates with conductor 147 and thus lead 145 via conductor 149. Wash and rinse water control solenoid valves 23, 31 communicate with meter 129 via conductor 151, 153 in addition to connection therewith via lead 145.

Control of the above described electrical and hydraulic circuits is maintained by persons using stalls in the car wash system by means of the coin operated timing meters 129. A control circuit for this meter is illustrated in FIG. 3, which shows portions of the apparatus shown in FIG. 2, including magnetic starters 61, 63, wash solenoids 23, 21; and leads 135, 131, 151 and 153 which communicate with the terminals 155, 157, which are referred to as first and second contacts of a first double throw switch and with terminals 159 and 161, which are referred to as first and second contacts of a second double throw switch, Alternatively, such terminals are contact points of a double pole, double throw switch 162, which is commonly a toggle switch located on a control panel (not shown) in each car wash stall. Contacts 155, 157, 159 and 161 are sometimes hereinafter referred to as first, second, third and fourth contacts of a switch means 162, which may have a variety of forms. Switch arms 163, 165 are connected with terminals 167, 169, are free to move into contact with terminals 155, 159 or terminals 167, 161.

Terminals 167, 169 communicate with a pair of fixed contact points 171, 173 via conductors 175, 177.

Another set of contact points 178, 179 are movable into and away from engagement with fixed contact points 171, 173 by a cam 181 controlled by a timer 183 driven by a timer motor 185 as indicated by the phantom line 186. Movable contacts 178, 179 have terminals 187, 189 which communicate via conductors 191, 193 with conductor 143 and thus with the 115 volt power source. Timer motor 185 communicates via conductor 195 with conductor 177 and thus with contact point 173 and via conductor 197 with lead 143 and consequently, also with the 115 volt A.C. power source.

The fixed and movable contact points 171, 173 and 178, 179 may be referred to as a first set of contacts 171, 178 and a second set of contacts 173, 179 and may be actuated upon insertion of a coin into the associated meter. After coil insertion, mechanical movement of a control knob may be used to urge the contacts together. Alternatively, these contacts may be controlled by electrical relays; my invention is not limited to any particular form of contact movement means. When the contacts close, the timer motor is energized to rotate cam 181, giving the user of the car wash stall a measured period of time in which to selectively spray wash water or rinse water on his vehicle by movement of the toggle switch 162. Portions of the energizing circuits for the common primary wash motor and primary rinse motor are connected in parallel as indicated by the conductors 199, 201.

OPERATION DESCRIPTION

In operation, a coin is dropped in the coin slot (not shown) in the meter 129 of one of the car wash stalls, causing movable contact points 178, 179 of the double pole single through switch to engage fixed contacts 171, 173. With the control arms 163, 165 of the meter toggle switch in the center position, the control circuit is open, and no current flows to the wash pump or rinse pump magnetic starts 61, 63 or to the wash or rinse water control solenoid valves 23, 25, 31, 33.

When no car is being washed or rinsed, electric energy flows through conductors 105, 107, auxiliary contacts 101, 103; conductors 117, 119 to the rinse and circulation pumps 121, 123, returning to the power source 115 through conductors 122, 124. Similarly, electric energy flows through conductors 105, 107, auxiliary contacts 101, 103; conductors 125, 127 to the solenoids 71, 75; through conductors 126, 128 and conductors 122, 124 to the 115 volt power source 115. Consequently, the rinse and wash water circulation pumps 121, 123 are energized and fluid flows through the wash water circulation loop 11 and the rinse water circulation loop 13. Energization of solenoids 71, 75 opens the associated by-pass valves to reduce the pressure in the circulation loops.

Since the rinse water in the storage tank 47 is heated in water heater 77 and circulated through the rinse water storage tank 47 by circulation pump 79, the water flowing through the rinse water circulation loop 13 is constantly warmed, thereby preventing freezing during cold weather and enabling more effective car wash. The wash water storage tank 49 and the rinse water storage tank are separated by a partition 50 which is of relatively thin, heat conducted material such as stainless steel or galvanized steel, and consequently, the wash water in storage tank 39 is warmed by the transfer of heat therethrough. Hence, the water in the wash water circulation loop 11 is constantly warmed to prevent freezing during cold weather even when none of the spray nozzles 15, 17 are in use.

If the toggle switch 162 is moved to a position such that arms 163, 165 engage terminals 155, 159, then electric energy may flow between conductors 143, 145 (see FIG. 3), via conductors 193, 191; fixed and movable contact points 178, 179 and 171, 173; conductors 175, 177; arms 163, 165; conductors 135, 151; wash pump starter 61 and wash water control solenoid valve 23; and conductors 139, 147, hence closing an electrical circuit with the 115 volt power source. This starts the wash pump primary motor 59, closes solenoid valve 75, pressurizes the fluid in the wash water circulation loop 11, opens the wash water control solenoid valve 31, and enables the discharge of a high pressure stream of wash water on the automobile.

As previously stated, wash water primary pump 37 may be capable of putting up 600 lbs. or more of pressure, and to prevent excessive pressurization of the fluid in the wash water circulation loop 11, by-pass valve 73 is designed to open at above 600 p.s.i. pressure to enable wash water to flow through by-pass conduit 67 and into the wash water storage tank 49. As previously explained, the same by-pass system is installed in the rinse water circulation loop to prevent excessive pressurization of fluids therein.

When the operator of the toggle switch 162 decides to rinse the wash water from his vehicle, he moves the toggle switch to a position such that the arms 163, 165 move downward as viewed in FIG. 3 to engage the terminals 157, 161. This closes a circuit between the rinse water primary pump starter 63 and 115 volt power source 115 and simultaneously, closes another circuit between the rinse water control solenoid valve 31 and the 115 volt source via conductors 143, 145; conductors 193, 191; movable and fixed contacts 178, 179 and 171, 173; conductors 175, 177; through arms 163, 167 of switch 162; conductors 131, 153; and conductors 137, 149. Also, this opens the above described circuits between the wash pump starter 61, stopping the wash pump primary motor 37 while closing the wash water control valve solenoid 23. The auxiliary relay 103 is actuated to start the wash water circulation motor pump 123 and open solenoid valve 75. With the toggle in the downward position, rinse water primary motor 35 is started since the magnetic starter 61 has been energized by closing its associated circuit, and auxiliary contact 101 stops the rinse water circulation motor pump 121 and closes the solenoid valve 71. Thus, rinse water primary pump 35 is energized and the fluid in the rinse water circulation loop circulated at a pressure of 600 lbs. Simultaneously, the rinse water control valve solenoid 31 is energized since its circuit with the 115 volt power source is closed and rinse water immediately flows through the associated spray nozzle.

It should be apparent from the foregoing description that I have provided an invention having significant advantages. The use of the rinse water and the wash water circulation loops in which warm water is continuously circulated irrespective of whether or not a spray nozzle is being used, prevents the fluid in the system from freezing during cold weather, provides better washes, and in addition, enables almost instantaneous change from rinse water to wash water and back again upon movement of the associated toggle switch 162. The constant circulation of wash water prevents the settlement of cleaning compound from the wash water.

The use of centrally located circulation pumps and circulation loops decreases the number of components required as compared to prior art systems in which at least one pump was required for each individual wash location. As a consequence, I can provide higher quality equipment more economically to significantly reduce maintenance problems.

Moreover, the use of a by-pass system in each circulation loop which enables pressure over a selected level to activate a by-pass valve to return a circulating fluid to its storage tank prevents excessive and damaging pressure build-up in the system.

The construction of the wash water and rinse water storage tanks in a manner such that they are separated by a heat transferring partition and the constant circulation of water enables the wash water to be automatically heated by using a conventional water heater to heat initially only the rinse water in its storage tank.

The use of the electrical control circuit as shown in FIG. 3 accomplishes interconnection in said system to establish control of the primary pumps 35, 37 from any car wash location or stall coin operated meter 129; at the same time, control of any wash or rinse water control valve 23, 31 from any source other than the particular coin operated meter associated with the respective wash or rinse water control valve is precluded.

*I previously utilized timers in which the first set 178, 171 and second set 179, 173 of contacts were controlled by electrical relays but after experiencing significant difficulty with such an arrangement, successfully adopted the use of the cam 181 driven by the timer 183 to control the contacts. The cam or mechanically controlled system operates with significant reliability.*

While I have shown my invention in only one of its forms, it should be apparent to those skilled in the art that it is not so limited, but is susceptible to various changes and modification without departing from the spirit thereof.

I claim:

1. In an automotive vehicle wash system having rinse and wash water circulation loops at each car wash location or stall, spray nozzles in each loop at each location for discharging water on a vehicle, rinse and wash solenoid operated control valves separately connected with said loops for selectively discharging wash or rinse water through each nozzle, a wash water primary pump and energization means, and a rinse water primary pump and energization means, the improvement comprising:

a coin operated meter for each said car wash location;

each said meter having a first set of contacts, a second set of contacts, a first single pole double throw switch means, and a second single pole double throw switch means;

each said meter having timer means and *mechanical* means for closing said first and second contact sets simultaneously [and starting said timer means] upon acceptance by said meter of a coin, [and] *said mechanical* means *being* responsive to said timer for simultaneously opening said first and second contact sets at the end of a timed interval;

power source leads;

means for connecting said first set of contacts serially with a first contact of said first double throw switch and said wash water primary pump electric motor energizing means and said power source leads, and means also for connecting said first set of contacts serially with a second contact of said first double throw switch and said rinse water primary pump electric motor energizing means and said power source leads;

means for connecting said second set of contacts serially with a first contact of said second double throw switch and said wash water control valve solenoid and said power source lead, and means also for connecting said second set of contacts serially with a second contact of said second double throw switch and said rinse water control valve solenoid and said power source leads;

means connecting said first contact of said first double throw switch with the same contact in each meter at each car wash location, and means connecting said second contact of said first double throw switch with the same contact in each meter at each car wash location;

whereby electrical interconnection in said system allows control of said primary pumps from any of said car wash location coin operated meters, but control of any wash or rinse water control valve from any source other than the particular coin operated meter associated with said respective wash or rinse water control valve is precluded.

2. In an automotive vehicle wash system having rinse and wash water circulation loops at each car wash location or stall, spray nozzles in each loop at each location or stall, spray nozzles in each loop at each location for discharging water on a vehicle, rinse and wash solenoid operated control valves separately connected with said loops for selectively discharging wash or rinse water through each nozzle, a wash water primary pump and energization means, and a rinse water primary pump and energization means, the improvement comprising:

a coin operated meter for each said car wash location;

each said meter having a first set of contacts, a second set of contacts, and a double pole double throw switch means;

each said meter having timer means and *mechanical* means for closing said first and second contact sets simultaneously [and starting said timer means] upon acceptance by said meter of a coin, [and] *said mechanical* means *being* responsive to said timer for simultaneously opening said first and second contact sets at the end of a timed interval;

power source leads;

means for connecting said first set of contacts serially with a first contact of said double throw switch means and said wash water primary pump electric motor energizing means and said power source leads, and means also for connecting said first set of contacts serially with a second contact of said double throw switch means and said rinse water primary pump electric motor energizing means and said power source leads;

means for connecting said second set of contacts serially with a third contact of said double throw switch means and said wash water control valve solenoid and said power source leads, and means also for connecting said second set of contacts serially with a fourth contact of said double throw switch means and said rinse water control valve solenoid and said power source leads;

means separately connecting said first and second contacts of said double throw switch means with the same contact in each meter at each car wash location;

whereby electrical interconnection in said system allows control of said primary pumps from any of said car wash location coin operated meters, but control of any wash or rinse water control valve from any source other than the particular coin operated meter associated with said respective wash or rinse water control valve is precluded.

3. In an automotive vehicle wash system having rinse and wash water circulation loops at each car wash location or stall, spray nozzles in each loop at each location for discharging water on a vehicle, rinse and wash solenoid operated control valves separately connected with said loops for selectively discharging wash or rinse water through each nozzle, a wash water primary pump and energization means, and a rinse water primary pump and energization means, the improvement comprising:

a coin operated meter for each said car wash location;

each said meter having a first set of contacts, a second set of contacts, and switch means connected in series with said sets of contacts;

each said meter having timer means and *mechanical* means for closing said first and second contact sets simultaneously [and starting said timer means] upon acceptance by said meter of a coin, [and] *said mechanical* means *being* responsive to said timer for simultaneously opening said first and second contact sets at the end of a timer interval;

power source leads;

means for connecting said first set of contacts serially with a first contact of said switch means and said wash water primary pump electric motor energizing means and said power source leads, and means also for connecting said first set of contacts serially with a second contact of said switch means and said rinse water primary pump electric motor energizing means and said power source leads;

means for connecting said second set of contacts serially with a third contact of said switch means and said wash water control valve solenoid and said power source leads, and means also for connecting said second set of contacts serially with a fourth contact of said switch means and said rinse water control valve solenoid and said power source leads;

means separately connecting said first and second contacts of said switch means with the same contact in each meter at each car wash location;

whereby electrical interconnection in said system allows control of said primary pumps from any of said car wash location coin operated meters, but control of any wash or rinse water control valve from any source other than the particular coin operated meter associated with said respective wash or rinse water control valve is precluded.

*4. The system defined by claim 1, 2 or 3 in which said mechanical means comprises a cam actuated by said timer and in operative connection with said first and second sets of contacts.*

References Cited

The following references, cited by the Examiner, are of record in the patented file of this patent or the original patent.

UNITED STATES PATENTS

| | | | |
|---|---|---|---|
| 2,751,915 | 6/1956 | Roberts | 134—123 |
| 3,175,564 | 3/1965 | Baird, Jr. et al. | 134—58 |
| 3,207,165 | 9/1965 | Durrant | 134—95X |

OTHER REFERENCES

"National Pride Car Wash," brochure, Mar. 13, 1965.

STANLEY H. TOLLBERG, Primary Examiner

U.S. Cl. X.R.

134—123